United States Patent
Guralnik et al.

(10) Patent No.: US 8,407,223 B2
(45) Date of Patent: Mar. 26, 2013

(54) SYSTEM FOR INFORMATION DISCOVERY IN VIDEO-BASED DATA

(75) Inventors: Valerie Guralnik, Mound, MN (US); Kirk Schloegel, Minneapolis, MN (US); Petr Cisar, Ceske Velenice (CZ)

(73) Assignee: Honeywell International Inc., Morristown, NJ (US)

(*) Notice: Subject to any disclaimer, the term of this patent is extended or adjusted under 35 U.S.C. 154(b) by 160 days.

(21) Appl. No.: 12/829,725

(22) Filed: Jul. 2, 2010

(65) Prior Publication Data
US 2012/0005208 A1 Jan. 5, 2012

(51) Int. Cl.
*G06F 7/00* (2006.01)
*G06F 17/30* (2006.01)
(52) U.S. Cl. .................... 707/737; 707/749; 348/563
(58) Field of Classification Search .............. 707/749, 707/803, 737; 382/118; 348/563
See application file for complete search history.

(56) References Cited

U.S. PATENT DOCUMENTS

| | | |
|---|---|---|
| 6,266,053 B1* | 7/2001 | French et al. ............. 715/255 |
| 7,016,307 B2 | 3/2006 | Vasudev et al. |
| 7,249,123 B2 | 7/2007 | Elder et al. |
| 7,366,759 B2 | 4/2008 | Trevithick et al. |
| 7,512,628 B2 | 3/2009 | Chess et al. |
| 7,519,200 B2 | 4/2009 | Gokturk et al. |
| 7,800,616 B2 | 9/2010 | Said et al. |
| 8,041,082 B1* | 10/2011 | Baluja et al. ............. 382/118 |
| 2007/0174272 A1 | 7/2007 | Carter et al. |
| 2007/0239764 A1* | 10/2007 | Song et al. ............. 707/102 |
| 2007/0250898 A1 | 10/2007 | Scanlon et al. |
| 2007/0296863 A1* | 12/2007 | Hwang et al. ............. 348/563 |
| 2008/0010304 A1* | 1/2008 | Vempala et al. ............. 707/100 |
| 2008/0091723 A1 | 4/2008 | Zuckerberg et al. |
| 2009/0290755 A1 | 11/2009 | Ma et al. |
| 2009/0292549 A1 | 11/2009 | Ma et al. |
| 2009/0307772 A1 | 12/2009 | Markham et al. |
| 2010/0036875 A1 | 2/2010 | Miezianko et al. |

FOREIGN PATENT DOCUMENTS
WO 2008039401 4/2008

OTHER PUBLICATIONS

Apostal et al., "Checkmate Network Security Modeling, IEEE Computer Society, Proceedings of DARPA Information Survivability Conference & Exposition II," pp. 214-226, Jun. 12-14, 2001.
U.S. Appl. No. 12/816,314, filed Jun. 15, 2010.

(Continued)

*Primary Examiner* — Cam Truong
(74) *Attorney, Agent, or Firm* — Seager Tufte & Wickhem LLC.

(57) ABSTRACT

A system for information discovery of items, such as individuals or objects, from video-based tracks. The system may compute similarities of characteristics of the items and present the results in a matrix form. A similarity portrayal may have nodes representing the items with edges between the nodes. The edges may have weights in the form of vectors indicating similarities of the characteristics between the nodes situated at the ends of the edges. The edges may be augmented with temporal and spatial properties from the tracks which cover the items. These properties may play a part in a multi-objective presentation of information about the items in terms of a negative or supportive basis. The presentation may be partitioned into clusters which may lead to a merger of items or tracks. The system may pave a way for higher-level information discovery such as video-based social networks.

5 Claims, 10 Drawing Sheets

OTHER PUBLICATIONS

Djidjev, "A Scalable Multilevel Algorithm for Graph Clustering and Community Structure Detection," Algorithms and Models for the Web-Graph, Fourth International Workshop, 17 pages, Nov. 30-Dec. 1, 2006.

Goldszmidt et al., "Qualitative Probabilities for Default Reasoning, Belief Revision, and Casual Modeling," Artificial Intelligence, vol. 84, pp. 57-112, 1996.

Hanneman et al., "Introduction to Social Network Methods," Online at http://faculty.ucr.ed/-hanneman/nettext/, 296 pages, printed Apr. 4, 2008.

Heimerdinger, "Scyllarus Intrusion Detection Report Correlator and Analyzer," Proceedings of the DARPA Information Survivability Conference and Exposition (DISCEX '03), vol. II, 12 pages, 2003.

Karypis et al., "Chameleon: Hierarchial Clustering Using Dynamic Modeling," IEEE Computer Society, vol. 32, No. 8, pp. 68-74, Aug. 1999.

Karypis et al., "Multilevel Algorithms for Multi-Constraint Graph Partitioning," 25 pages, May 5, 1998.

Karypis et al., "Parallel Graph Partitioning and Sparse Matrix Ordering Library Version 3.1," Parametis, 29 pages, Aug. 15, 2003.

Kenyon, "Adaptive Response Tool Foils Hacker Intrusion," Signal, pp. 33-35, Aug. 1999.

Ketkar et al., "Subdue: Compression-Based Frequent Pattern Discovery in Graph Data," OSDM 2005, Proceedings of the First International Workshop on Open Source Data Mining, pp. 71-76, 2005.

Musliner et al., "World Modeling for the Dynamic Construction of Real-Time Control Plans," Artificial Intelligence vol. 74, pp. 83-127, 1995.

Schloegel et al., "A New Algorithm for Multi-Objective Graph Partitioning," Euro-Par' 99 Parallel Processing, 5th International Euro-Par Conference Proceedings, pp. 322-331, Aug. 31-Sep. 3, 1999.

Schloegel et al., "Graph Partitioning for High-Performance Scientific Simulations," Sourcebook of Parallel Computing, pp. 491-541, 2002.

Schloegel et al., "Parallel Static and Dynamic Multi-Constraint Graph Partitioning," Concurrency and Computation: Practice and Experience, vol. 14, pp. 219-240, 2002.

\* cited by examiner

| | P1 | P2 | P3 | P4 | P5 | P6 | P7 | P8 | P9 | ... |
|---|---|---|---|---|---|---|---|---|---|---|
| P1 | 1 | .8 | .5 | .2 | .4 | .9 | .7 | .3 | .6 | |
| P2 | .2 | 1 | .0 | .5 | .8 | .1 | .6 | .4 | .7 | |
| P3 | .7 | .5 | 1 | .2 | .6 | .4 | .9 | .1 | .3 | |
| P4 | .8 | .1 | .4 | 1 | .3 | .2 | .0 | .5 | .6 | |
| P5 | .3 | .6 | .9 | .4 | 1 | .5 | .7 | .1 | .2 | |
| P6 | .9 | .8 | .3 | .7 | .1 | 1 | .2 | .0 | .4 | |
| P7 | .4 | .6 | .7 | .9 | .3 | .5 | 1 | .3 | .8 | |
| P8 | .8 | .0 | .2 | .6 | .2 | .9 | .7 | 1 | .5 | |
| P9 | .7 | .6 | .1 | .0 | .8 | .0 | .4 | .9 | 1 | |
| ... | | | | | | | | | | |

*Figure 2*

SYSTEM FOR INFORMATION DISCOVERY IN VIDEO-BASED DATA

BACKGROUND

The invention pertains to discovery of information from video data, and particularly to finding items disclosed in the information. More particularly, the invention pertains to determining relationships among the items.

SUMMARY

The invention is a system for information discovery of items, such as individuals or objects, from video-based tracks. The system may compute similarities of characteristics of the items and present the results in a matrix form. A similarity portrayal may have nodes representing the items with edges between the nodes. The edges may have weights in the form of vectors indicating similarities of the characteristics between the nodes situated at the ends of the edges. The edges may be augmented with temporal and spatial properties from the tracks which cover the items. These properties may play a part in a multi-objective presentation of information about the items in terms of a negative or supportive basis. The presentation may be partitioned into clusters which may lead to a merger of items or tracks. The system may pave a way for good group discovery in things like video-based social networks.

BRIEF DESCRIPTION OF THE DRAWING

FIG. 2 is a diagram of similarity matrix;

DESCRIPTION

Figure 1:
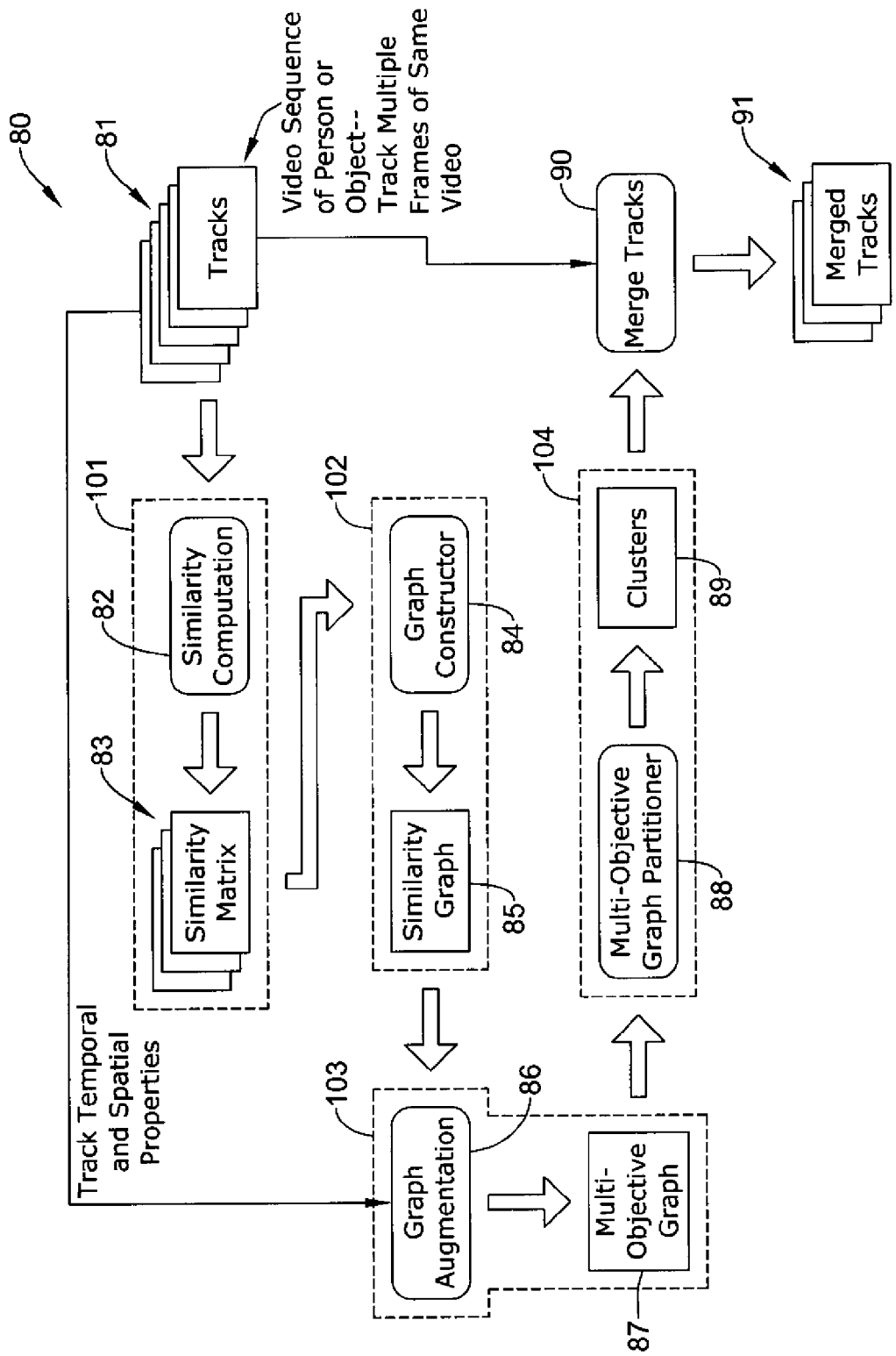
FIG. 1 is a flow diagram of the present system.

A key challenge that needs to be addressed by nodal video data analysis is to enable robust cross-data analysis in the presence of node ambiguity. This may be due to the uncertainty that typically results from tracking entities in the presence of occlusions, stops and spatial and temporal gaps.

A crucial step is node disambiguation, which correlates subjects across cameras and time (e.g., if a subject leaves the view of a camera and later returns). This step may be crucial to enable integrated data mining or analyses across time and space. The primary means one may use to correlate subjects is to compare results of a face and/or body similarity computation. Given two images of subjects, the similarity computation may compute a score that specifies how similar the two images are. Therefore, if a single image is compared against all other images in the image database, an ordered list of images may be generated for it.

The similarity computation may have a number of disadvantages. First, due to the non-linear nature of the computation, only order can be derived from the results, but not comparative magnitude. E.g., assume image A is compared to images B and C and results in similarity metrics of 10 and 20, respectively. It does not necessarily follow then that B is twice as likely as C to be a match to A. While B is more similar to A than C, nothing more can really be said regarding the relative similarity. Another disadvantage is that general threshold values cannot necessarily be used across images. E.g., one cannot necessarily create a static rule that any pair of images with a similarity score over one hundred are to be considered different subjects. For some images, one hundred may be a good score. For others, it may be a poor match. Therefore, using only a similarity measure between images may be insufficient for node disambiguation.

The present invention is based on the following observations. The same subject cannot be observed in different places at the same time. In order for a subject to be observed at different locations, the time to travel to that location should be sufficient. Two tracks of similar subjects are more likely to belong to the same person if they are (almost) contiguous. That is, it appears more advantageous to cluster two similar tracks if they are also similar in time and space then to cluster two similar tracks that are not close in time and space.

The present node disambiguation approach may rely on multi-objective partitioning algorithms to cluster together tracks that are likely to represent the same person that a company, such as Honeywell International Inc., may apply to multi-modal data arising from a video recognition domain, including face and body similarity data, kinematic data, archived social network data, and so forth, to detect, correlate, and disambiguate individuals and groups across space and time.

One may use exclusivity constraints to indicate that two nodes may not refer to the same subject. Subjects that are observed at different locations at about the same time may not necessarily be clustered together. In addition, subjects observed at different location may not necessarily be clustered together if the temporal gap between observations is not sufficient for the subject to travel from one location to another.

Additionally, the similarity weights to connect two subjects may be dynamically adjusted based on temporal and spatial proximity. The more closely in time and space the subjects are the more importance one may put on similarity of those two subjects. Thus, the subjects observed over large temporal and spatial gap should only be clustered together if their similarity measure is extremely strong.

Multi-objective graph partitioning may compute clusters given graphs that have multiple types of edge and nodes, whose edge weights cannot be meaningfully combined.

Information in a graph may also or instead be in a form of a portrayal, rendition, presentation, depiction, layout, representation, or the like.

FIG. 1 is a flow diagram 80 of the present system. For illustrative purposes, six tracks (more or less) may be provided to symbol 82 for similarity computation. A track 81 may be a video sequence of a person or object. A track may be multiple frames of the same video. In diagram 80, symbols with rounded corners may indicate a process or activity. Symbols with square corners may indicate a result or product of a preceding process or activity. An output of the similarity computation 82 may be a set of similarity matrices 83, perhaps one for each characteristic to be compared among several persons listed in the axes of each matrix. The matrices 83 may be converted into a similarity graph 85 which may be regarded as a graphical representation of the matrices 83. Each person may be a node. The nodes may be connected by edges. The edges may have vectors show a weight for each characteristic comparison between the nodes. Examples of characteristics may be face, body and gait. The strength of each similarity may be determined with a weight number. Another comparison may include spatial and temporal properties. These numbers corresponding to weights are not simply added up to determine overall similarity for clustering. Besides a weight number or indicator, there may be a factor of importance which is multiplied with each respective characteristic weight. For instance, the factors for face, body and gait similarities may be 10, 1 and 1, respectively. The factor for spatial and temporal properties may be 3. An algorithm may be designed to take in the weights and factors and calculate and determine clusterability of two (more or less) tracks, items, persons or nodes.

After the similarity graph 85 construction, a graph augmentation at symbol 86 may bring in the track special and temporal properties and tie them into the graph already having vectors for the characteristics. A result may be a multi-objective graph 87 of the items, tracks, nodes or persons in a form of vector edges with the characteristics in terms of similarity values between the nodes. A multi-objective graph partitioner 88 may take the values of the edge vectors and determine which nodes belong in the same cluster with a similarity score calculated by an algorithm. The result may be clusters 89. From these cluster 89 indications, tracks 81 may be a merge track process 90 accordingly resulting in merged tracks 91.

In flow diagram 80, similarity computation 82 and similarity matrix may be in a similarity module 101. Graph constructor 84 and similarity graph 85 may be in a graph module 102. Graph augmentation 86 and multi-objective graph 87 may be in an augmentation module 103. Multi-objective graph partitioner 88 and clusters 89 may be in a cluster module 104. Merge tracks 90 may be a merger module 90.

FIG. 2 is a diagram of similarity matrix 83. The matrix may list items (e.g., persons) P1-P9 on two axes of the matrix. The numbers may be weights of similarity of a characteristic between any two of the items listed. There may be a matrix 83 indicating weights of similarities for each characteristic among the items listed. For instance there may be a matrix for similarities of faces, a matrix for bodies, a matrix for gaits, and so on.

Figure 3:
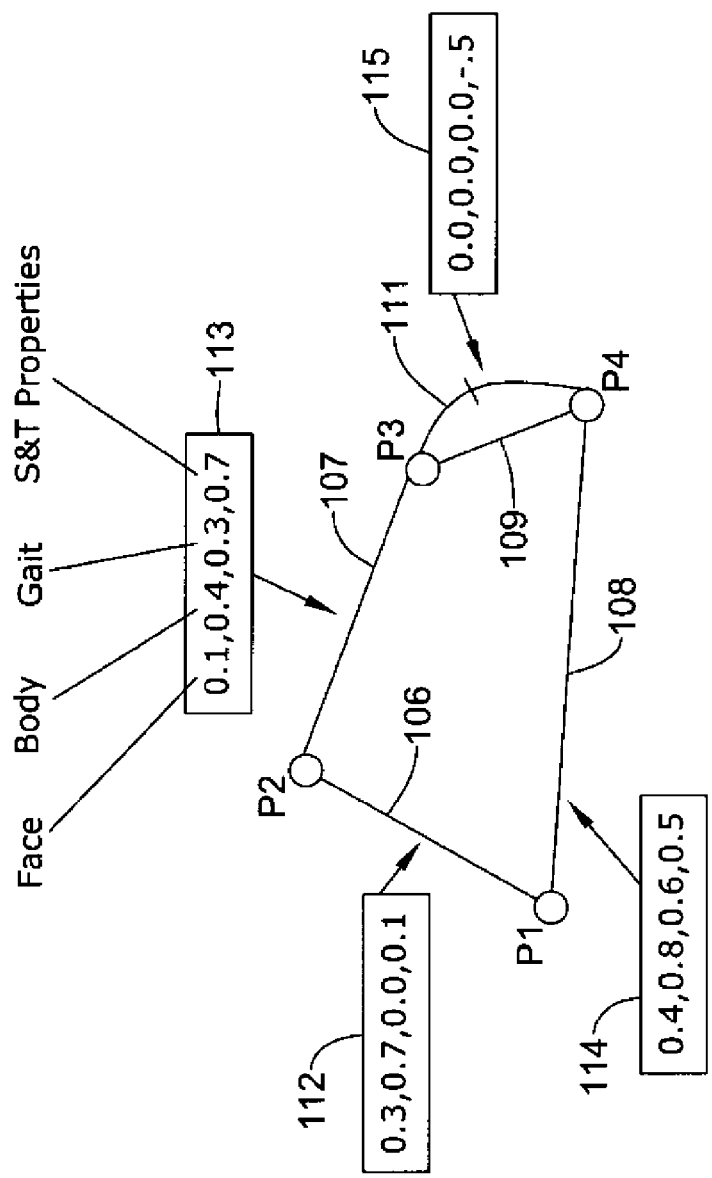
FIG. 3 is a diagram of node, edges and corresponding vectors.

FIG. 3 is a diagram of nodes P1, P2, P3 and P4. There may be an edge 106 between P1 and P2, an edge 107 between P2 and P3, and an edge 108 between P1 and P4. The may be edges 109 and 111 between P3 and P4. Weights may be associated with each of the edges. The weights may be expressed in a form of vectors 112, 113, 114 and 115 for edges 106, 107, 108, and 109, respectively. The numbers in vector boxes represent similarities of the face, body, gait, and spatial and temporal properties between each pair of the nodes connected with the respective edges. Vector 115 indicates a negative association of a −0.5 of the spatial and temporal properties as indicated by a line 111. This may indicate that P3 and P4 cannot possibly have any association due to spatial or temporal conflicts. The numbers in the vector 115 box are zeros meaning that there are no similarities with the characteristics face, body or gait between P3 and P4.

Figure 4:
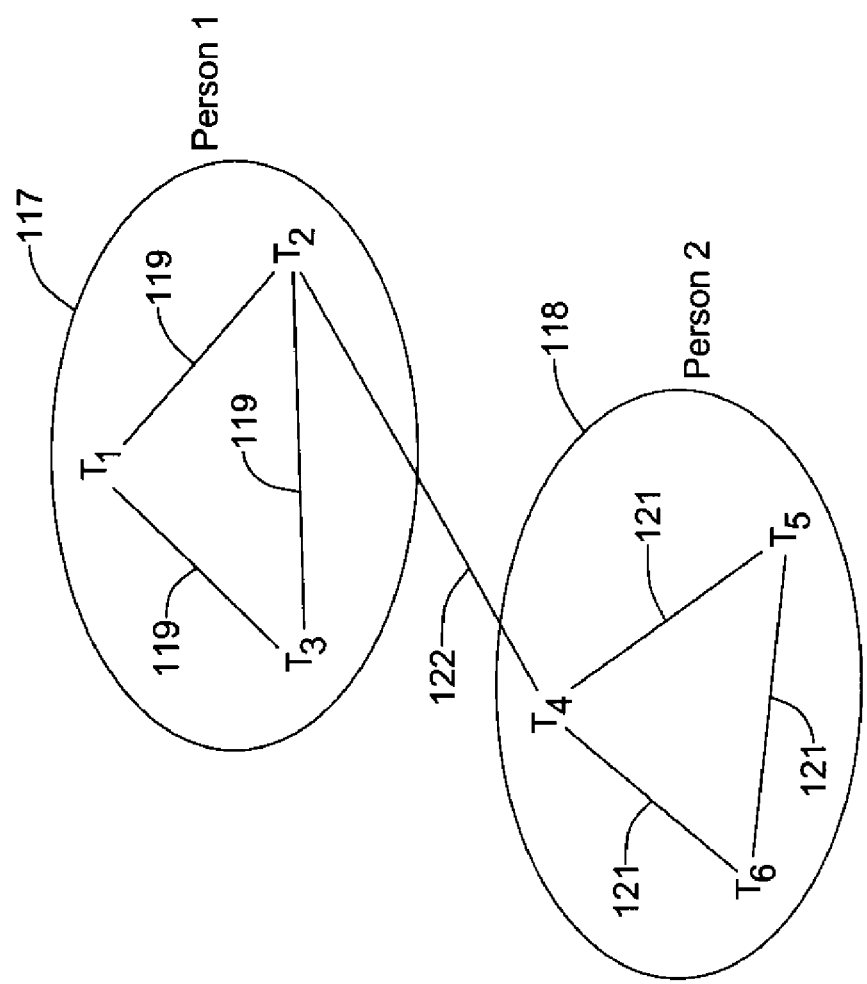
FIG. 4 is a diagram of a number of tracks of two persons as indicated by edges between pairs of tracks and a line enclosures.

FIG. 4 is a diagram of tracks T1-T6. T1, T2 and T3 may be shown to be tracks of a person 1 as indicated by edges 119 and a line enclosure 117. T4, T5 and T6 may be shown to be tracks of a person 2 as indicated by edges 121 and a line enclosure 118. An edge between T2 and T4 may reveal some association of person 1 and person 2.

Figure 5:
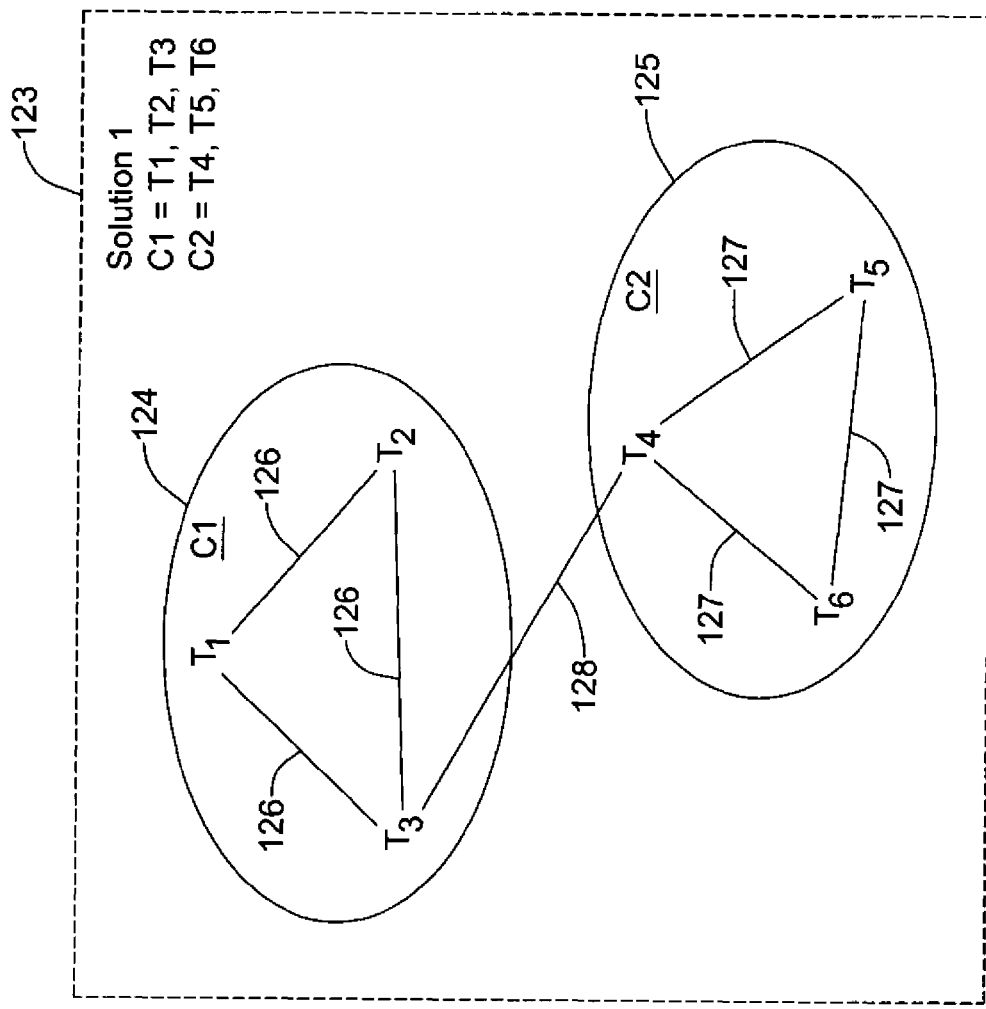
FIGS. 5 and 6 are diagrams of two different solutions of clustering of tracks.

FIG. 5 is a diagram of a solution 1 as indicated by a symbol 123 of clusters 124 (C1) and 125 (C2). Edges 126 may indicate similarities between T1 and T2, T2 and T3, and T3 and T1, which is a basis for clustering T1, T2 and T3. Edges 127 may indicate similarities between T4 and T5, T5 and T6, and T6 and T4, which is a basis for clustering T4, T5 and T6. An edge 128 may indicate similarities between T3 and T4, which is a basis for associating clusters 124 and 125.

Figure 6:
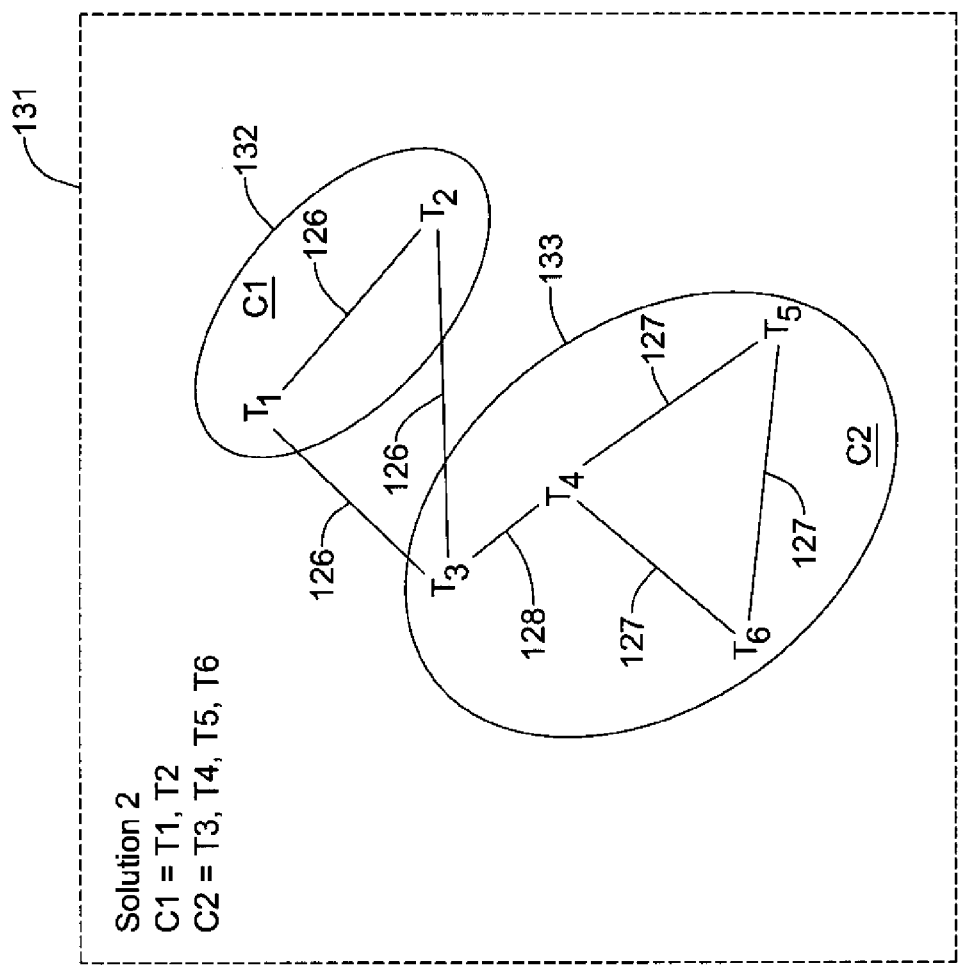

FIG. 6 is a diagram of a solution 2 as indicated by a symbol 131 of clusters 132 (C1) and 133 (C2). Tracks T1, T2, T3, T4, T5 and T6 may have edges 126, 127 and 127 like those in solution 1 (symbol 123). In solution 2, T1 and T2 form a cluster 132 (C1) and T3, T4, T5 and T6 form a cluster 133 (C2). The tracks and edges may be similar but the solution is different. Two edges 126 and 128 indicate a basis for associating clusters 132 and 133. The solution that is preferred may be dependent upon the particular values of the edge weight vectors associated with edges 126 and 128.

Figure 7:
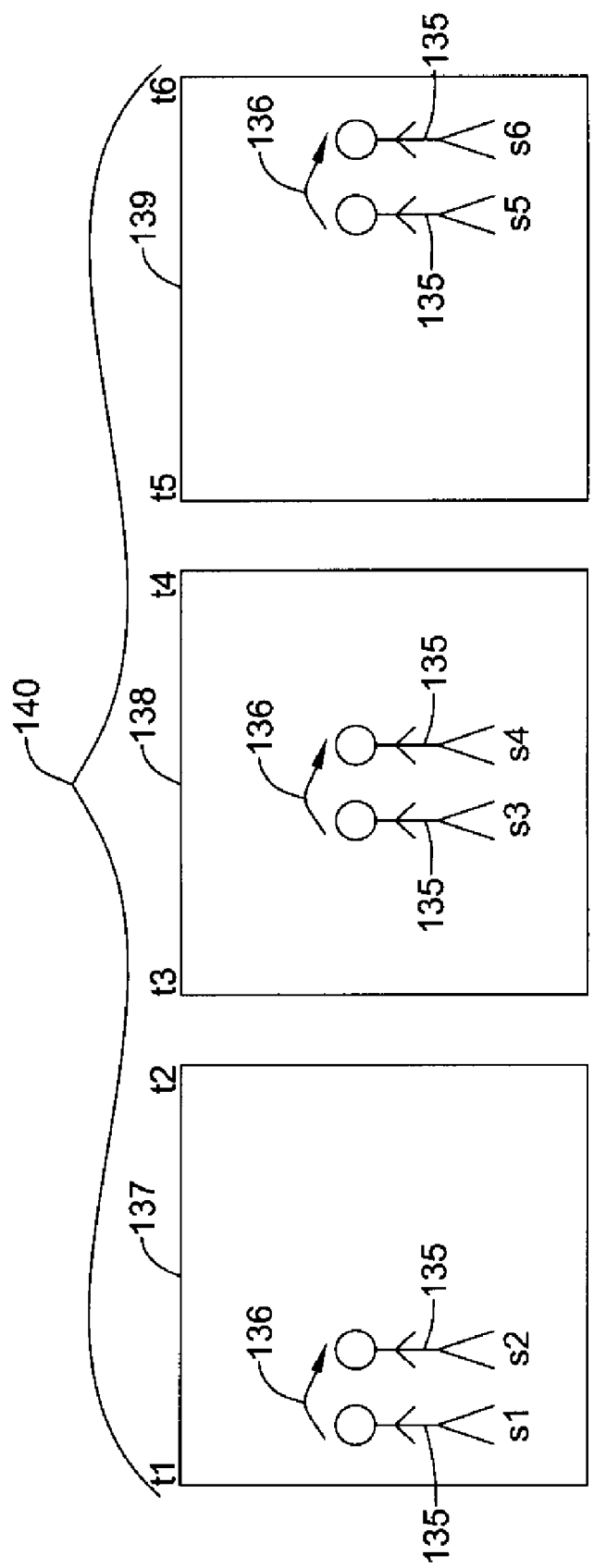
FIG. 7 is a diagram of a series of frames of a track tending to indicate the same person in all of the frames.

FIG. 7 is a diagram of three frames of a video track 140 of apparently the same person. Frame 137 shows a person 135 moving from one place to another on the left side of the frame during a period from t1 to t2 as indicated by the motion arrow 136. Frame 138 shows a person who appears to be person 135 moving from one place to another at the center of the frame during a period from t3 to t4 as indicated by the motion arrow 136. Frame 139 shows a person who appears to be person 135 moving from one place to another on the right side of the frame during a period from t5 to t6 as indicated by the motion arrow 136. The spatial and temporal properties indicate the person in all of the frames to be the same one. This is because t2 and t3 are in temporal proximity and t4 and t5 are in temporal proximity and s2 and s3 are in spatial proximity and s4 and s5 are in spatial proximity. This may indicate a relatively large value in the element of the associated edge weight vector that represents spatial and temporal properties. Also noted are location marks s1 and s6 of person 135.

Figure 8:
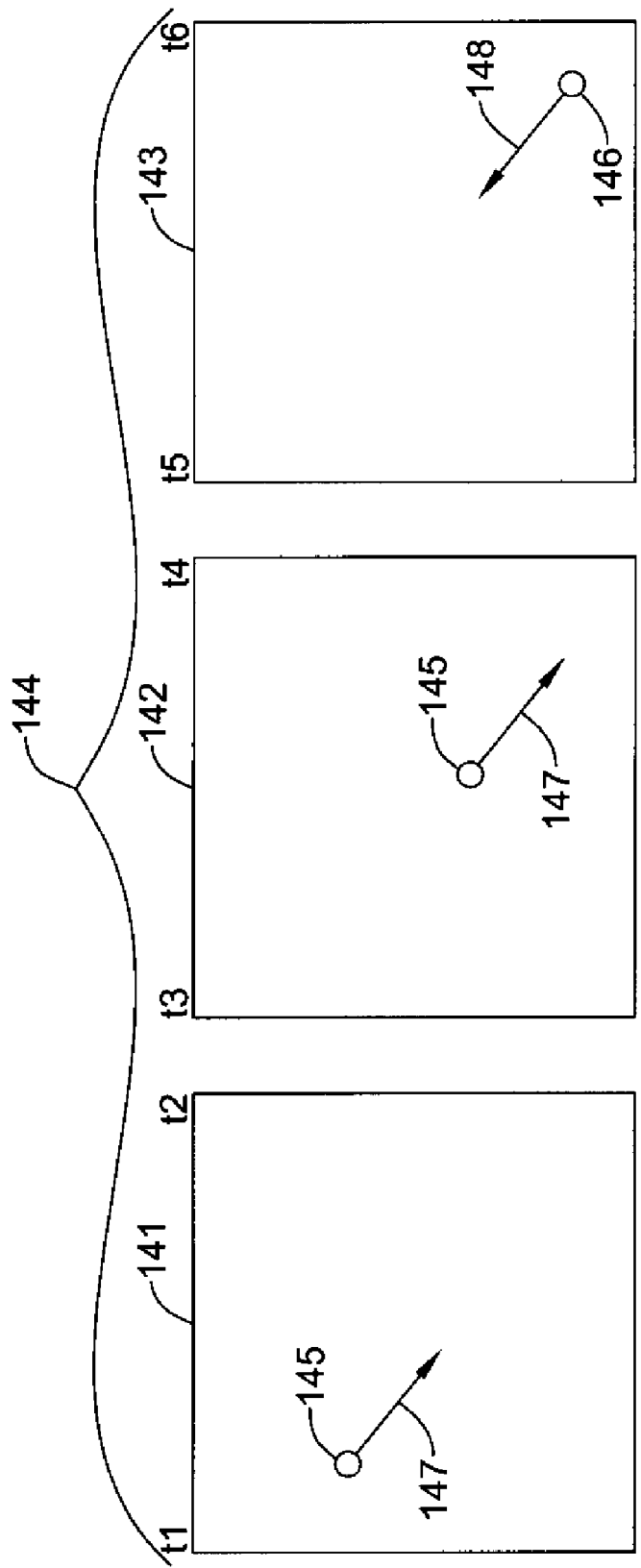
FIG. 8 is a diagram of a series of frames of a track tending to indicate not the same person in all of the frames.

FIG. 8 is a diagram of three frames of a video track 144 of arguably the same person. Frame 141 shows a person 145 moving in a direction from left to right on the left side of the frame during a period from t1 to t2 as indicated by a vector 147. Frame 142 shows a person who appears to be person 114 moving from left to right at about the center of the frame during a period from t3 to t4 as indicated by vector 147. Frame 139 shows a person who could be person 145 but appears to be a person 146 moving from right to left on about the right side of the frame during a period from t5 to t6 as indicated by a vector 148. The spatial, temporal, and kinetic properties indicate that the person in frame 143 is different than the person in frames 141 and 142 due to the sudden change in movement direction. This may indicate a negative value in the element of the associated edge weight vector that represents spatial and temporal properties.

Figure 9:
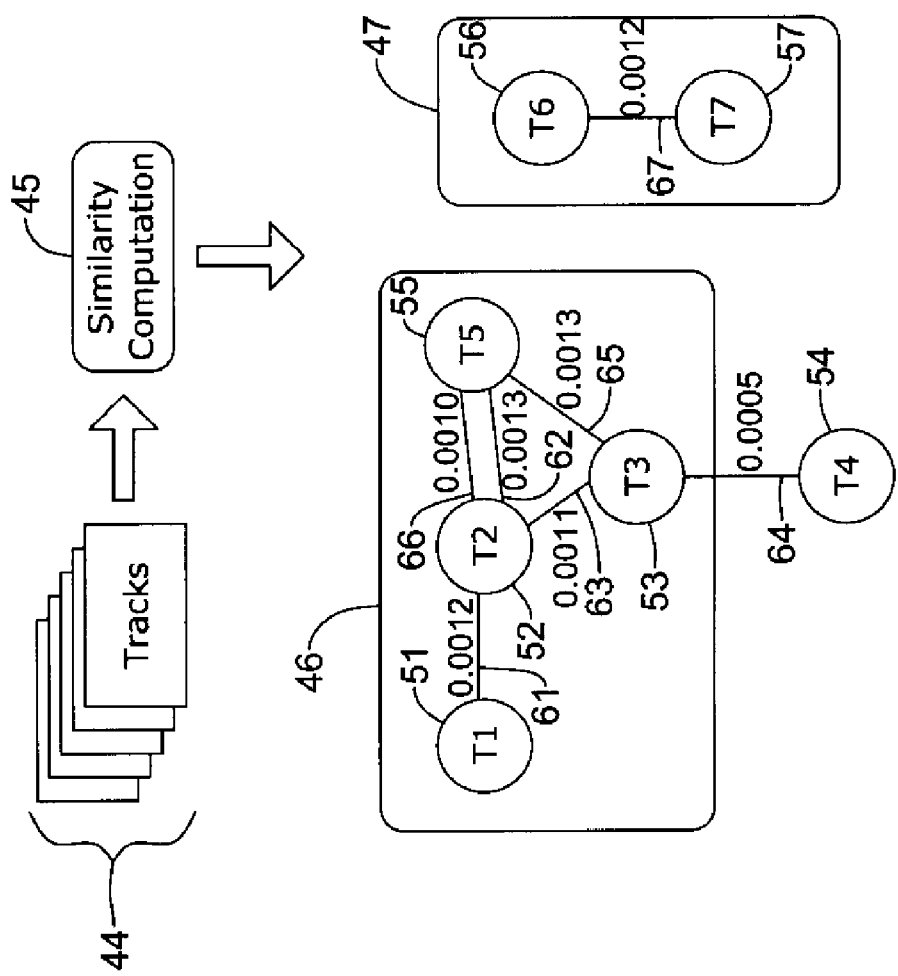
FIG. 9 is a diagram of a partitioning approach for track grouping for phase one clustering.

FIG. 9 is a diagram of a partitioning approach for track grouping for phase 1 clustering. A goal of phase 1 is to cluster tracks over short time frames. A group of tracks 44 may be provided for a similarity computation at block 45. The relation may be a not all-to-all. There may be a negative association based on temporal locality and temporal constraints. From block 45, similarity results may be used to construct similarity graphs 46 and 47. The tracks T1, T2, T3, T4, T5, T6 and T7 may be nodes 51, 52, 53, 54, 55, 56 and 57, respectively. Edges 61, 62, 63, 64, 65, 66 and 67 may be similarity scores between the nodes. Edge 61 may show a similarity score 0.0012 between nodes 51 and 52. Edge 62 may show a similarity score 0.0013 between nodes 52 and 55. Edge 63 may show a similarity score 0.0011 between nodes 52 and 53. Edge 64 may show a similarity score 0.0005 between nodes 53 and 54. Edge 65 may show a similarity score of 0.0013 between nodes 53 and 55. An additional edge 66 may be added between nodes 52 and 55, based on temporal, spatial, and/or kinetic locality. Edge 66 may show a similarity score of 0.0010. The cluster score for graph 46 may be 0.00098. The cluster score is total internal edge weight divided by the number of possible edges. Other cluster metrics may be used such as the total internal edge weight divided by the number of nodes in the cluster. Graph 47 may be a recursively partition graph based upon spatial, temporal constraints and threshold cluster scores. An edge 67 may show a similarity score of 0.0012 between nodes 56 and 57. The cluster score for graph 47 is 0.0012.

Figure 10:
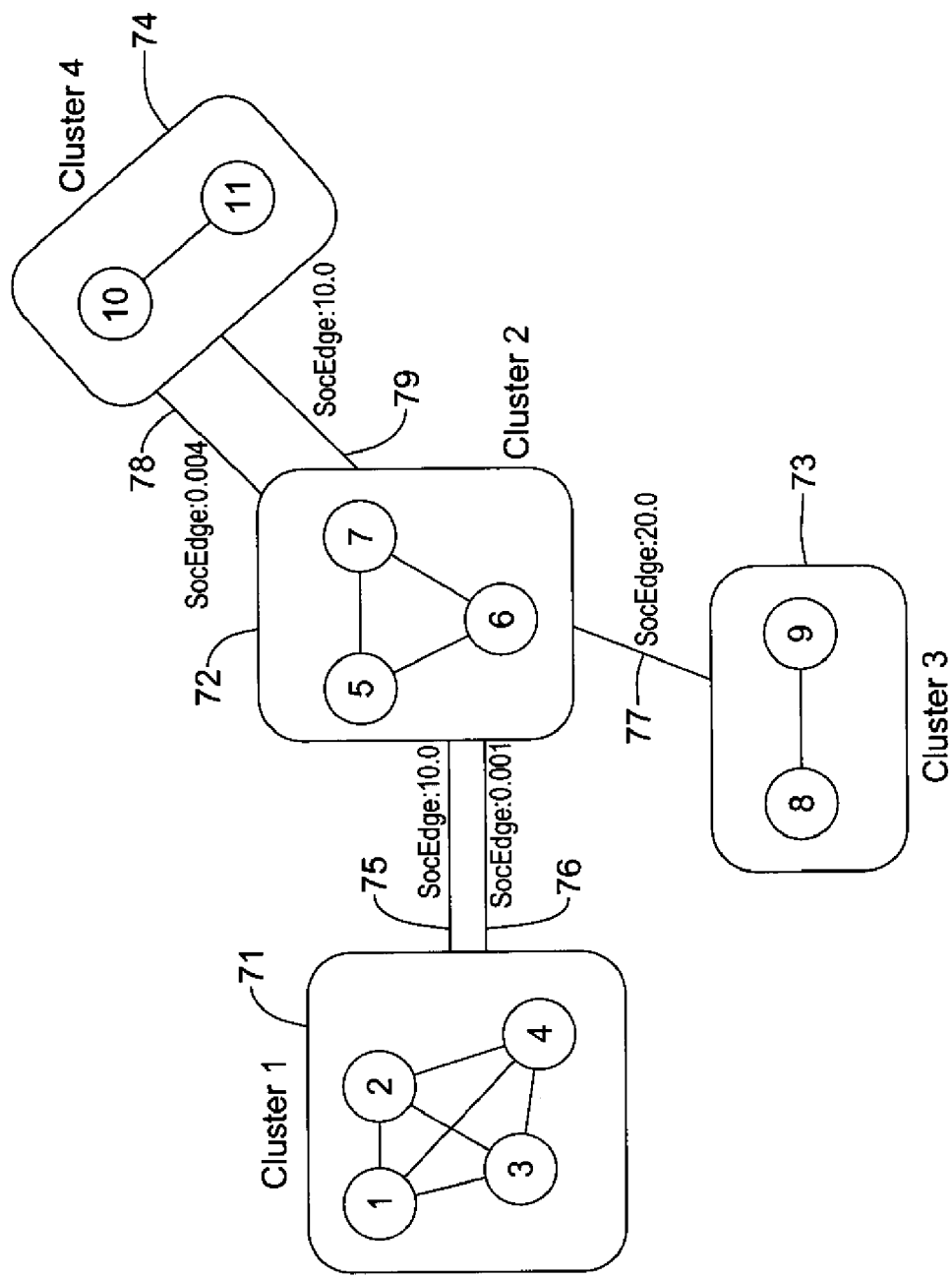
FIG. 10 is a diagram of a network analysis for phase two clustering.

FIG. 10 is a diagram of a network analysis for phase 2 clustering. A goal of phase 2 is to cluster spatially and temporally distant tracks. Multi-objective graph or portrayal partitioning may be applied to further cluster clusters-of-tracks into super clusters. Multi-objective graph or portrayal partitioning may also compute clusters, given diagrams or presentations that have multiple types of edges whose edge weights cannot necessarily be meaningfully combined. Clusters 71, 72, 73 and 74 are shown. Each cluster may be one of the tracks which are nodes with edges between them, as illustrated in FIG. 9. The clusters may have edges between which reveal inter-cluster similarity (SimEdge) and social relation (SocEdge) scores. A social relation may indicate that an association is likely based on pre-existing social network data. The social edge 75 score between cluster 71 and cluster 72 may be 10.0. The similarity relation score at edge 76 between clusters 71 and 72 may be 0.001. The social relation score at edge 77 between clusters 72 and 73 may be 20.0. The similarity score at edge 78 between clusters 72 and 74 may be 0.004. The social score at edge 79 between clusters 72 and 74 may be 10.0.

The following applications may be relevant. U.S. patent application Ser. No. 12/547,415, filed Aug. 25, 2009, and entitled "Framework for Scalable State Estimation Using Multi Network Observations", is hereby incorporated by reference. U.S. patent application Ser. No. 12/369,692, filed Feb. 11, 2009, and entitled "Social Network Construction Based on Data Association", is hereby incorporated by reference. U.S. patent application Ser. No. 12/187,991, filed Aug. 7, 2008, and entitled "System for Automatic Social Network Construction from Image Data", is hereby incorporated by reference. U.S. patent application Ser. No. 12/124,293, filed May 21, 2008, and entitled "System Having a layered Architecture for Constructing a Dynamic Social Network from Image Data", is hereby incorporated by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. An information discovery network system comprising:
one or more cameras;
a track module for obtaining video-based tracks, the tracks having a first number of items;
a similarity module connected to the track module, the similarity module computes similarities among characteristics of the first number of items within the tracks and provides a similarity matrix for each characteristic of the characteristics using the computed similarities;
a portrayal module connected to the similarity module, the portrayal module for constructing a similarity portrayal having nodes representing the items with edges between the nodes having weights in a form of vectors indicating similarities of the characteristics of the items at ends of the edges;
an augmentation module connected to the portrayal module, the augmentation module providing a multi-objective portrayal by augmenting the edges of the similarity portrayal with temporal and spatial properties from the tracks covering the first number of items;
a cluster module connected to the augmentation module, the cluster module for partitioning the multi-objective portrayal into clusters; and
a merger module connected to the cluster module and the track module, the merger module for merging the tracks according to the clusters from the track module; and
wherein a multi-objective partitioning algorithm determines a cluster threshold based on the weights of a vector of the vectors to determine whether the items of an edge are to be clustered with each other;
a weight of said each characteristic of the characteristics is multiplied by a factor to result in a product; the factor is a number which is relative to an impact of a characteristic for a track; and products of the weights of the characteristics and the spatial and temporal properties, and factors are determinate of an importance of an edge for clustering.

2. The system of claim 1 wherein the merger module outputs a second number of merged tracks.

3. The system of claim 2, wherein the first number is equal to or greater than the second number.

4. The system of claim 1, wherein the cluster module determines clusters with a multi-objective partitioning algorithm that incorporates weights at the edges indicating similarities of the characteristics of the items represented by the nodes proximate to the edges.

5. The system of claim 4, wherein a number of clusters from the cluster module determines the second number of merged tracks.

* * * * *